(12) United States Patent
McClure et al.

(10) Patent No.: US 7,724,172 B2
(45) Date of Patent: *May 25, 2010

(54) DIGITAL-TO-ANALOG CONVERTER CIRCUIT AND METHOD

(75) Inventors: David C. McClure, Carrollton, TX (US); Sooping Saw, The Colony, TX (US)

(73) Assignee: STMicroelectronics, Inc., Carrollton, TX (US)

(*) Notice: Subject to any disclaimer, the term of this patent is extended or adjusted under 35 U.S.C. 154(b) by 37 days.

This patent is subject to a terminal disclaimer.

(21) Appl. No.: 12/020,861

(22) Filed: Jan. 28, 2008

(65) Prior Publication Data

US 2008/0191917 A1    Aug. 14, 2008

Related U.S. Application Data

(62) Division of application No. 11/474,669, filed on Jun. 26, 2006, now Pat. No. 7,362,248.

(60) Provisional application No. 60/739,150, filed on Nov. 22, 2005.

(51) Int. Cl.
 *H03M 1/78* (2006.01)
(52) U.S. Cl. .................................... 341/154; 327/525
(58) Field of Classification Search .......... 341/144–154
 See application file for complete search history.

(56) References Cited

U.S. PATENT DOCUMENTS

| | | | |
|---|---|---|---|
| 4,034,366 A * | 7/1977 | Memishian, Jr. ............ 341/154 |
| 4,468,652 A * | 8/1984 | Wang et al. ................. 341/154 |
| 5,185,717 A | 2/1993 | Mori |
| 5,239,664 A | 8/1993 | Verrier et al. |
| 5,394,019 A * | 2/1995 | Audy ......................... 327/525 |
| 5,394,078 A | 2/1995 | Brokaw et al. |
| 5,400,007 A | 3/1995 | McClure |
| 5,535,168 A | 7/1996 | Yepez et al. |
| 5,619,430 A | 4/1997 | Nolan et al. |

(Continued)

FOREIGN PATENT DOCUMENTS

EP    1 081 477    3/2001

OTHER PUBLICATIONS

Partial European Search Report for EP 06 25 5947, Mar. 13, 2007.

*Primary Examiner*—Lam T Mai
(74) *Attorney, Agent, or Firm*—Lisa K. Jorgenson; Andre M. Szuwalski

(57) ABSTRACT

A digital-to-analog converter, in response to a digital signal, selectively taps a resistor string to generate an analog output and selectively shunts around resistors in the string to voltage shift the analog output. If two supply voltage sets are present, two strings are provided. A mutually exclusively selection of outputs is made to select a source of the analog output. An integrated circuit temperature sensor uses the converter and includes a sensing circuit that determines exposure to one of a relatively low or high temperature. A measured voltage across the base-emitter of a bipolar transistor is selected in low temperature exposure and compared against a first reference for a too cold temperature condition. Alternatively, a measured delta voltage across the base-emitter is selected in high temperature exposure and compared against a second reference voltage for a too hot temperature condition. Through the comparisons, a temperature exposure detection is made.

15 Claims, 15 Drawing Sheets

U.S. PATENT DOCUMENTS

| | | |
|---|---|---|
| 5,854,635 A | 12/1998 | Wakamatsu et al. |
| 6,217,213 B1 | 4/2001 | Curry et al. |
| 6,288,638 B1 | 9/2001 | Tanguay et al. |
| 6,489,831 B1 | 12/2002 | Matranga et al. |
| 6,549,053 B1 | 4/2003 | Evans et al. |
| 6,600,639 B1 | 7/2003 | Teo et al. |
| 6,750,683 B2 | 6/2004 | McClure et al. |
| 7,030,793 B2 | 4/2006 | McLeod et al. |
| 7,042,380 B2 * | 5/2006 | Iacob et al. ................ 341/154 |
| 2002/0021590 A1 | 2/2002 | Lammers et al. |
| 2003/0118079 A1 | 6/2003 | Marinet et al. |

* cited by examiner

# DIGITAL-TO-ANALOG CONVERTER CIRCUIT AND METHOD

PRIORITY CLAIM

This application is a divisional of U.S. Application for patent Ser. No. 11/474,669 entitled "TEMPERATURE TAMPER DETECTION CIRCUIT AND METHOD" filed Jun. 26, 2006, which claims the benefit of U.S. Provisional Application for Patent Ser. No. 60/739,150, filed Nov. 22, 2005, the disclosures of which are hereby incorporated by reference.

BACKGROUND

1. Technical Field

The present invention relates to a digital-to-analog converter circuit, and in particular, to a resistive divider type digital-to-analog converter operable in connection with two different high side supply voltages.

2. Description of Related Art

Digital-to-analog converters are well known circuits. These circuit are presented in a variety of circuit configurations. Some configurations utilize a resistive divider circuit in connection with the conversion for producing the analog output signal from a multi-bit digital input. When such resistive divider based digital-to-analog converter circuits are fabricated as integrated circuits, a problem arises in that the resistors and associated transistors for tapping tend to occupy a significant amount of area. As emphasis is placing on reducing the area of an integrated circuit, the area occupied by the digital-to-analog converter becomes a significant concern.

A need accordingly exists in the art to provide a resistive divider type digital-to-analog converter which occupies less space. This can be accomplished, for example, by emphasizing a reduction in the number of resistors and transistors without giving up on sensitivity, step size and range.

It is further recognized that integrated circuits may have operational modes a different voltages. More specifically, the high side operating voltages for some part of the integrated circuit may change dependent on operational mode or some other factor. If the digital-to-analog converter is present in this part of the circuit, and if the digital-to-analog converter is resistive divider based, then this change in high side operating voltage may adversely affect converter operation and skew resolution and accuracy. There is accordingly a need in the art to address this issue and allow a single digital-to-analog converter to be used in connection with two different voltage sets.

SUMMARY

In accordance with an embodiment, a digital-to-analog converter comprises an input receiving a digital signal, an output providing an analog signal corresponding to the digital signal and a resistor string comprising a first set of series connected resistors and a second set of series connected resistors, wherein the first and second sets are series connected together. A first plurality of taps are taken from the resistors in the first set of series connected resistors, and a first circuit selects one of those taps based on the received digital signal for connection to the output. A first plurality of selectively actuated shunts are provided around the resistors in the second set of series connected resistors, and a second circuit selects one or more of the shunts based on the digital signal to effectuate a shift in voltage range for the analog signal at the output.

In an embodiment, a digital-to-analog converter comprises: a string of series connected resistors which are divided into a first string portion connected in series with a second string portion at a first node, wherein the first string portion includes a first plurality of series connected resistors and the second string portion includes a first plurality of series connected resistors; a first set of circuits responsive to a digital input signal and coupled to the first node and connection nodes in the second string portion which selectively choose one node from the first node and connection nodes for connection to output an analog output signal; and a second set of circuits responsive to the digital input signal and coupled to the first node and connection nodes the first string portion which selectively shunt across resistors in the first string portion to shift a voltage range in which the output analog output signal lies.

In an embodiment, a digital-to-analog converter comprises: a first string of series connected resistors connected between a first and a second power supply voltages; a second string of series connected resistors connected between a third and a fourth power supply voltages; a first set of circuits responsive to a digital input signal and coupled to connection nodes in the first string of series connected resistors which selectively choose one node from the connection nodes for connection to a first intermediate analog voltage node; a first set of circuits responsive to the digital input signal and coupled to connection nodes in the second string of series connected resistors which selectively choose one node from the connection nodes for connection to a second intermediate analog voltage node; and a circuit for selectively connecting one of the first and second intermediate analog voltage nodes to output an analog output signal corresponding to the digital input signal, wherein the circuit for selectively connecting is responsive to a control signal indicative which one of the first and second strings of series connected resistors is to be used in generating the analog output signal.

In an embodiment, a method comprises: dividing a string of series connected resistors into a first string portion connected in series with a second string portion at a first node, wherein the first string portion includes a first plurality of series connected resistors and the second string portion includes a first plurality of series connected resistors; selectively tapping from the second string portion in response to a digital input signal to generate an analog output signal; and selectively shunting across resistors in the first string portion to shift a voltage range in which the output analog output signal lies.

BRIEF DESCRIPTION OF THE DRAWINGS

A more complete understanding of the method and apparatus of the present invention may be acquired by reference to the following Detailed Description when taken in conjunction with the accompanying Drawings wherein:

FIG. 3D1-2 shows a circuit diagram of a possible implementation of the signal generator circuits for the temperature tampering detection circuit;

FIG. 3J1-4 shows a circuit diagram for a possible implementation of resistor array for the temperature tampering detection circuit;

DETAILED DESCRIPTION OF THE DRAWINGS

One type of tamper detection involves detecting whether the temperature of the IC or system falls outside (too high or too low) an expected operating range, and asserting an alarm responsive to such detection. Temperature detection serves to prevent a tamperer from accessing stored, sensitive data in part by the tamperer changing the operating temperature of the IC or system.

When two bipolar transistors are operated at different emitter-current densities, there exists a voltage difference between the two base-emitter voltages (hereinafter "delta Vbe"). It is recognized that a substantially linear relationship exists between temperature and the change in the base-emitter voltage of a bipolar transistor within the IC or system to be protected. Specifically, delta Vbe is substantially process insensitive and can be used for temperature sensing due to its superior linearity. To achieve good voltage/temperature sensitivity, the delta Vbe voltage needs to be amplified from its typical voltage variation over normal temperature conditions.

One difficulty encountered with monitoring delta Vbe over the entire operating temperature range is that the variation of amplified delta Vbe may not always be within the operating temperature range of the Vcc voltage supply to the IC or system. For example, with delta Vbe sensitivity of 6 mv/degree C., the Vbe voltage may vary from 1.2v at –45 degrees C. to 2.4v at 120 degrees C. Taking into consideration processing variations, this 1.2v delta Vbe variation between low and high temperature fails to fit within some relatively small Vcc operating ranges for the IC or system which may have a minimum Vcc voltage level of 1.2v.

Figure 1:
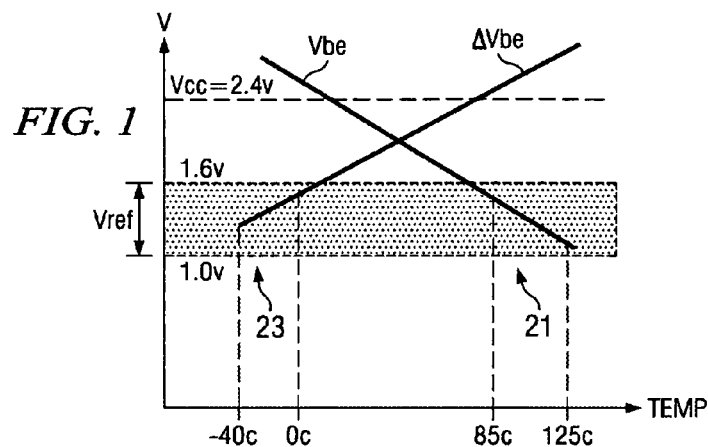
FIG. 1 is a graph illustrating Vbe and delta Vbe over an exemplary temperature range.

In an effort to ensure that temperature is accurately sensed over the entire operating temperature range of the IC, it is useful to not only monitor delta Vbe but also Vbe. Specifically, Vbe, the base-emitter voltage of a bipolar transistor within the IC or system, also varies substantially linearly with temperature. Whereas delta Vbe varies in direct proportion to changes in temperature, Vbe varies inversely proportional to temperature. A graph comparing Vbe and delta Vbe over an exemplary operational temperature range for the IC or system is shown in FIG. 1.

In order to monitor temperature over an entire operating temperature range, such as –40 degrees C. to 125 degrees C., the disclosed circuit monitors delta Vbe at relatively low temperatures and Vbe at elevated, or relatively high, temperatures. Specifically, delta Vbe is monitored at relatively low temperatures to determine whether the temperature falls below a first temperature (first threshold), and Vbe is monitored at relatively high temperatures to determine whether the temperature rises above a second temperature (second threshold). Because delta Vbe is less than a Vcc supply voltage level at relatively lower temperatures and Vbe is less than the Vcc supply voltage level at relatively higher temperatures, delta Vbe and Vbe may be monitored in this way by relatively easily comparing each to one or more reference voltages, such as a selected stable reference voltage Vref (see, FIG. 1) that, for example, is based upon a bandgap voltage. By comparing delta Vbe with the selected reference voltage Vref when the IC or system is exposed to a lower or relatively low temperature and by comparing Vbe with the selected reference voltage Vref when the IC or system is exposed to a higher or relatively high temperature, the temperature tamper detect circuit is capable of detecting tampering which is trying to be made by altering the temperature. Advantageously, the circuit is suitable for operation to make too low and/or too high temperature detections even when the IC or system is being operated at relatively low Vcc supply voltage levels (for example, 1.2v or 1.8v, and see FIG. 1 at lower than 2.4v).

Figure 2:
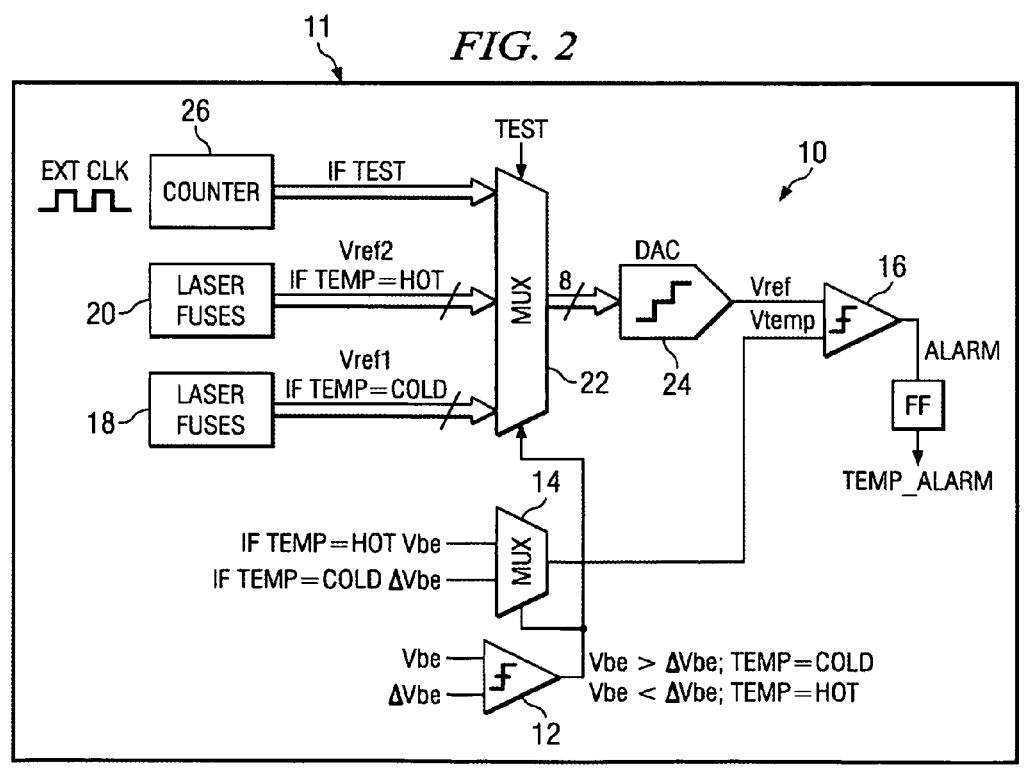
FIG. 2 is a block diagram of the temperature tampering detection circuit according to an embodiment.

FIG. 2 is a block diagram of the temperature tampering detection circuit (TTDC) 10 according to an embodiment. TTDC 10 is provided within an IC or system 11 and includes a first comparator 12 which compares delta Vbe with Vbe and generates an output signal that is used to determine whether delta Vbe or Vbe is to be compared to a reference voltage Vref. The comparison of delta Vbe with Vbe enables the circuit 10 to determine whether the IC or system 11 is currently experiencing a relatively low or relatively high temperature environment (see, FIG. 1 which illustrates the relationship between delta Vbe and Vbe over a range of temperatures, where temperatures less than the temperature at the intersection point being relatively low, while temperatures more than the temperature at the intersection point being relatively high). As will be discussed later in more detail, the comparison of one of delta Vbe or Vbe to the reference voltage Vref is being made in order to determine whether a temperature "out of range" condition exists for the IC or system (i.e., whether the IC or system is experiencing either a too cold or too hot environment in comparison to corresponding temperature thresholds). Comparator 12 may include hysteresis in order to avoid the output of comparator 12 from undesirably oscillating during the comparison operation.

TTDC 10 further includes multiplexer circuitry 14 having data inputs coupled to receive delta Vbe and Vbe signals and a select input coupled to the output of comparator 12. Based on the select input state (corresponding to relatively low/cold or relatively high/hot), one of the delta Vbe and Vbe signals is selected by multiplexer circuitry 14 for output from the multiplexer circuitry 14. More specifically, if the select input state corresponds to relatively low/cold, then multiplexer selects the delta Vbe signal at the data input since FIG. 1 shows that this signal is better used for making the too cold determination. Alternatively, if the select input state corresponds to relatively high/hot, then multiplexer selects the Vbe signal at the data input since FIG. 1 shows that this signal is better used for making the too hot determination.

TTDC 10 further includes a comparator 16 having its data inputs coupled to receive both a first reference voltage Vref and the selected output of multiplexer circuitry 14 (either delta Vbe or Vbe). Comparator 12, which determines whether delta Vbe or Vbe is to be utilized in determining whether an "out of range" temperature exists, thus is used to provide the appropriate delta Vbe or Vbe signal to comparator 16 through controlling the selection operation of the multiplexer circuit 14. The output of comparator 16 changes state based on the result of the comparison operation. Thus, if in relatively low mode, comparator 16 changes state when delta Vbe is less than a selected vref as this would be indicative of a too cold condition (see, reference 23 in FIG. 1). Conversely, if in relatively high mode, comparator 16 changes state when Vbe is less than a selected vref as this would be indicative of a too hot condition (see, reference 21 in FIG. 1).

The output from the comparator 16 may be an alarm signal (possibly buffered in a flip-flop FF). The alarm signal, when asserted, may cause the IC or system 11 to take measures to prevent sensitive data from being copied. For example, the alarm signal may cause the IC or system 11 to act on the stored, sensitive data by taking actions to erase and/or corrupt the stored data. The comparator 16 may have hysteresis in order to avoid the output of comparator 16 from undesirably oscillating during the comparison operation.

In order to monitor delta Vbe at low temperatures and Vbe at elevated temperatures, in one embodiment two voltage references Vref are utilized: one voltage reference Vref1 for use in determining whether the temperature falls below a predetermined low temperature (for the comparator 16 operation in determining whether delta Vbe is less than the voltage threshold), and a second voltage reference Vref2 for use in determining whether the temperature rises above a predetermined high temperature (for the comparator 16 operation in determining whether Vbe is less than the voltage threshold). With reference to FIG. 2, TTDC 10 further includes a first signal generator circuit 18 which generates a digital signal corresponding to first voltage reference Vref1, and a second signal generator circuit 20 which generates a digital signal corresponding to second voltage reference Vref2.

It will be understood, with reference to FIG. 1, that only a single vref value is needed as that specified vref could be used by the comparator 16 for purposes of making either of the temperature too low or temperature too high determinations. In such a case, only a single signal generator circuit 18/20 would be needed.

However, in a situation where a single voltage reference vref would not intersect the delta Vbe and Vbe lines at appropriate low and high temperature locations, respectfully, of interest, it would be preferred to use two voltage references Vref selectively chosen for the comparison operation based on whether the IC or system 11 was relatively cold or relatively hot.

First signal generator circuit 18 and second signal generator circuit 20 may each include programmable circuitry for setting and/or programming the digital signals corresponding to reference voltages Vref. Such programmability allows for the digital signals representing the reference voltages to be programmed to customer requirements. For example, first and second signal generator circuits 18, 20 may include fuses representing digital values which are selectively blown (for example, by laser) to set a digital value in circuits 18, 20 which corresponds to a certain voltage reference for use in the comparison operation performed by comparator 16. Alternatively, first and second code generator circuits 18, 20 may include programmable floating gate transistors, or other programmed or programmable components which achieve the same operation.

Multiplexer circuitry 22 receives at data inputs thereof the outputs of signal generator circuits 18 and 20, i.e., the digital values corresponding to a first reference voltage Vref1 and a second reference voltage Vref2. Multiplexer circuitry 22 receives at a control and/or select input thereof the output of comparator 12. This output, representative of whether a relatively low temperature condition or relatively high temperature condition exists, is applied as a selection signal to multiplexer circuitry 22 so as to selectively place at the output of multiplexer circuitry 22 a digital signal from circuit 18 corresponding to reference voltage Vref1 (if delta Vbe is to be measured and compared at the relatively low temperatures), or a digital signal from circuit 20 corresponding to reference voltage Vref2 (if Vbe is to be measured and compared at relatively high temperatures).

TTDC 10 further includes a digital-to-analog converter circuit 24 which receives the digital output of multiplexer circuit 22 and generates an analog voltage level Vref corresponding thereto. Converter circuit 24 may, for example, utilize a resistor voltage divider having switches, controlled by the digital output of the multiplexer circuit 22, which serve as taps along the resistor voltage divider. In this way, an analog voltage signal may be generated corresponding to the digital signal generated by the multiplexer circuit 22 and provided to converter circuit 24.

As shown in FIG. 2, the output of converter circuit 24 is the analog reference voltage signal Vref which is applied to a second input of comparator 16. Again, this analog reference voltage signal Vref may comprise reference voltage Vref1 (if delta Vbe is to be measured and compared at relatively low temperatures), or reference voltage Vref2 (if Vbe is to be measured and compared at relatively high temperatures). The comparator 16 functions to compare the analog reference voltage signal Vref to the output of multiplexer circuit 14 (delta Vbe or Vbe). When the voltage output of multiplexer circuit 14 (delta Vbe or Vbe) falls below the analog reference voltage signal Vref (Vref1 or Vref2), the comparator 16 output changes state thus indicating that the temperature environment of the IS or system 11 is extreme (too cold or too hot, respectively).

The operation of TTDC 10 will now be described. Initially, the output of comparator 12 identifies whether delta Vbe is to be compared to reference voltage Vref1 in order to determine if the temperature of the IC and/or system 11 falls below a predetermined low temperature, or whether Vbe is to be compared to reference voltage Vref2 to determine if the temperature of the IC and/or system 11 rises above a predetermined high temperature. This identification is reached by comparing delta Vbe to Vbe. If delta Vbe is greater than Vbe, a relatively higher temperature exists indicating that Vbe should be compared to reference voltage Vref2. See, FIG. 1 at reference 21. In this scenario, the output of comparator 12 is in a first logic state indicative of a relatively high temperature environment. Alternatively, if Vbe is greater than delta Vbe, a relatively lower temperature exists indicating that delta Vbe should be compared to reference voltage Vref1. See, FIG. 1 at reference 23. In this scenario, the output of comparator 12 is in a second logic state indicative of a relatively low temperature environment.

Next, multiplexer circuit 14 provides at its output a signal delta Vbe or Vbe, depending upon the logic state of the output of comparator 12. In other words, if a relatively low temperature condition exists (i.e., the output of comparator 12 is in the second logic state) and delta Vbe is to be compared with reference voltage Vref1, the delta Vbe signal is provided by multiplexer circuit 14 to comparator 16. If, on the other hand, a relatively high temperature condition exists (the output of comparator 12 is in the first logic state) and Vbe is to be compared with reference voltage Vref2, the Vbe signal is provided by multiplexer circuit 14 to comparator 16.

Further, multiplexer circuit 22 provides at its output either the digital signal corresponding to reference voltage Vref1 or the digital signal corresponding to reference voltage Vref2, based upon the logic state of the output of comparator 12. If the relatively low temperature condition exists and delta Vbe is to be compared with reference voltage Vref1, the digital signal corresponding to reference voltage Vref1 is provided by multiplexer circuit 22 to converter circuit 24. On the other hand, if the relatively high temperature condition exists and Vbe is to be compared with reference voltage Vref2, the digital signal corresponding to reference voltage Vref2 is provided by multiplexer circuit 22 to converter circuit 24. Converter circuit 24 converts the digital signal provided by multiplexer circuit 24 into an analog signal. The analog output of converter circuit 24 is analog reference signal Vref which is provided to comparator 16.

As a result, the analog signal Vref is a first analog voltage Vref1 to be compared with signal deltaVbe at relatively lower temperatures, and a second analog voltage Vref2 to be compared with signal Vbe at relatively higher temperatures. With signal generator circuits 18 and 20 providing output signals that are programmable, these first and second analog voltages may be defined according to customer requirements.

Comparator 16 compares analog signal Vref with the selected one of delta Vbe and Vbe signals. The output of comparator 16, perhaps buffered by the flip flop FF, is used to signal whether an out-of-range (too high or too low) temperature exists and has been detected. Such a signal could be indicative of tampering with the IC or system 11. An IC or system 11 may, for example, use the output of comparator 16 to selectively take appropriate measures to protect or destroy the sensitive data stored in the system. The output of comparator 16 may be temporarily stored in the flip flop FF, the output of which is used to generate temperature detection alarm signal temp_alrm.

As explained above, TTDC 10 may be used to detect whether the IC is operating below a predetermined low temperature threshold and/or above a predetermined high temperature threshold. Voltage references Vref1 and Vref2, which correspond to the predetermined low and high temperature thresholds, respectively, may be programmed in order to allow for the predetermined low and high temperature thresholds to be defined according to system or customer requirements. This programming may occur by operating the IC in a test mode when subjected to the predetermined low and/or high temperature environment so as to determine the appropriate fuses to blow for generating voltage references Vref1 and Vref2.

The TTDC 10 may also include test circuitry for testing various aspects of TTDC 10 and for setting and/or programming the voltage references Vref1 and Vref2. Specifically, the test circuitry may include a counter 26 which generates a counter output digital signal coupled to a third data input of multiplexer circuit 22. When the IC or system 11 is placed in the test mode, and is at or beyond the designated threshold temperature, the multiplexer circuit 22 may be controlled by signal "test" to select and provide at its output the output of counter 22.

In order to program voltage reference Vref1 to correspond to the predetermined low temperature below which signal deltaVbe triggers the alarm signal generated by TTDC 10, the IC is exposed to the predetermined low temperature and placed in the test mode. Multiplexer circuit 22 is controlled using the "test" signal so as to pass to converter circuit 24 the output of counter 26. Multiplexer circuit 14 is controlled by comparator 12 so as to pass signal deltaVbe to comparator 16. Counter 26 is then activated to begin counting from an initial state. Converter circuit 24 converts the output of counter 26 into an analog signal which is then compared at each increment value to the delta Vbe signal by comparator 16. When the output of comparator 16 transitions from a first logic state to a second logic state, the incremented state of counter 16 is recorded (as being representative of the low threshold temperature) and used to determine a digital value and thus further identify the particular fuses in signal generator circuit 18 which need to be blown in order to generate a similar analog reference voltage to compare with delta Vbe. In the event a fuse implementation for circuit 18 is not used, the incremented state of counter 16 is recorded and used to determine a digital value that is to be programmed into the circuit 18.

Similarly, in order to program voltage reference Vref2 to correspond to the predetermined high temperature above which signal Vbe triggers the alarm signal generated by TTDC 10, the IC is tested at the predetermined high temperature and placed in the test mode. Multiplexer circuit 22 is controlled using the "test" signal so as to pass to converter circuit 24 the output of counter 26. Multiplexer circuit 14 is controlled so as to pass signal Vbe to comparator 16. Counter 26 is then activated to begin counting from an initial state. Converter circuit 24 converts the output of counter 26 into an analog signal which is then compared at each increment value to the Vbe signal by comparator 16. When the output of comparator 16 transitions from a first logic state to a second logic state, the incremented state of counter 16 is recorded (as being representative of the high threshold temperature) and used to determine a digital value and thus further identify the particular fuses in signal generator circuit 20 which need to be blown in order to generate a similar analog reference voltage to compare with Vbe. In the event a fuse implementation for circuit 20 is not used, the incremented state of counter 16 is recorded and used to determine a digital value that is to be programmed into the circuit 20.

In addition to using counter 26 to identify the fuses to blow (or programming to be made) in signal generator circuits 18 and 20, counter 26 may also be used to verify that the hysteresis of comparator 16 is operating correctly. In particular, once the output of comparator 16 transitions from the first logic state to the second logic state due to counter 26 counting in a first direction, such as incrementing, counter 26 may be further controlled to count in the reverse direction, such as decrementing. The hysteresis of comparator 16 may be successfully tested by counting in the reverse direction until the output of comparator 16 toggles back to the first logic state. By noting the state of counter 26 which caused the output of comparator 16 to toggle back to the first logic state, and comparing such counter state with the state of counter 26 which caused the output of comparator 16 to initially toggle from the first logic state to the second logic state, the existence of a hysteresis, and its magnitude, for the comparator 16 may be sufficiently tested.

A possible implementation of TTDC 10 is shown in the schematic circuit drawings of FIGS. 3A-3L.

Figure 3A:
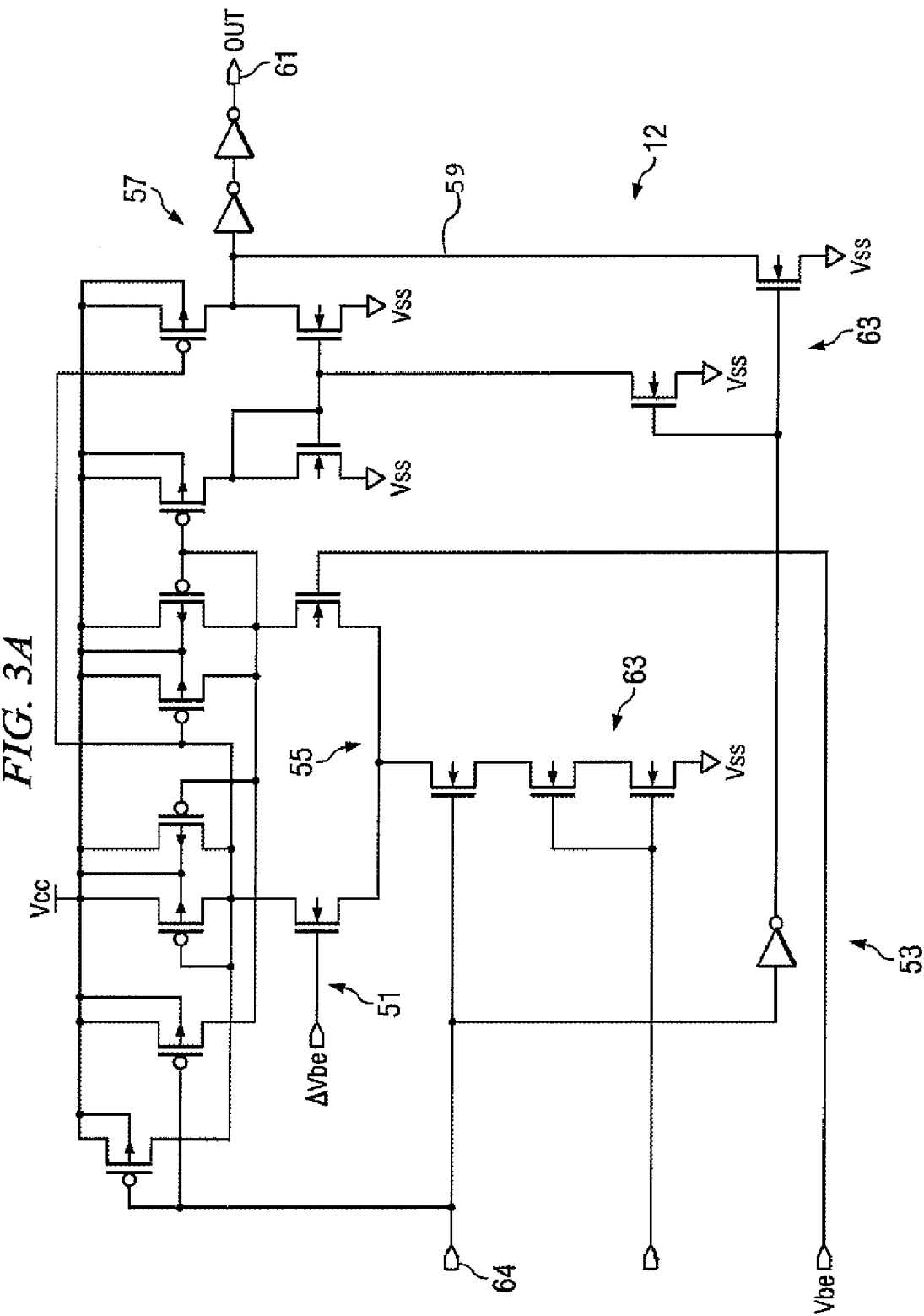
FIG. 3A shows a circuit diagram of a possible implementation of a comparator for the temperature tampering detection circuit.

FIG. 3A shows a circuit diagram of a possible implementation of comparator 12. As discussed above, comparator 12 may have hysteresis (for example, an approximately 50 mv hysteresis). The comparator 12 has a structure which receives at differential inputs 51, 53 the deltaVbe and Vbe voltages. A differential comparison circuit 55 compares the signals at inputs 51, 53. The result of that comparison is a current which is mirrored in a current mirror circuit 57 to generate a logic signal at node 59 which is representative of the result of the comparison. The logic signal at node 59 is buffered through a pair of logic inverters to generate an output 61. A control circuit 63 responds to control inputs 64 to enable operation of the comparison circuit 55 and current mirror circuit 57.

Figure 3B:
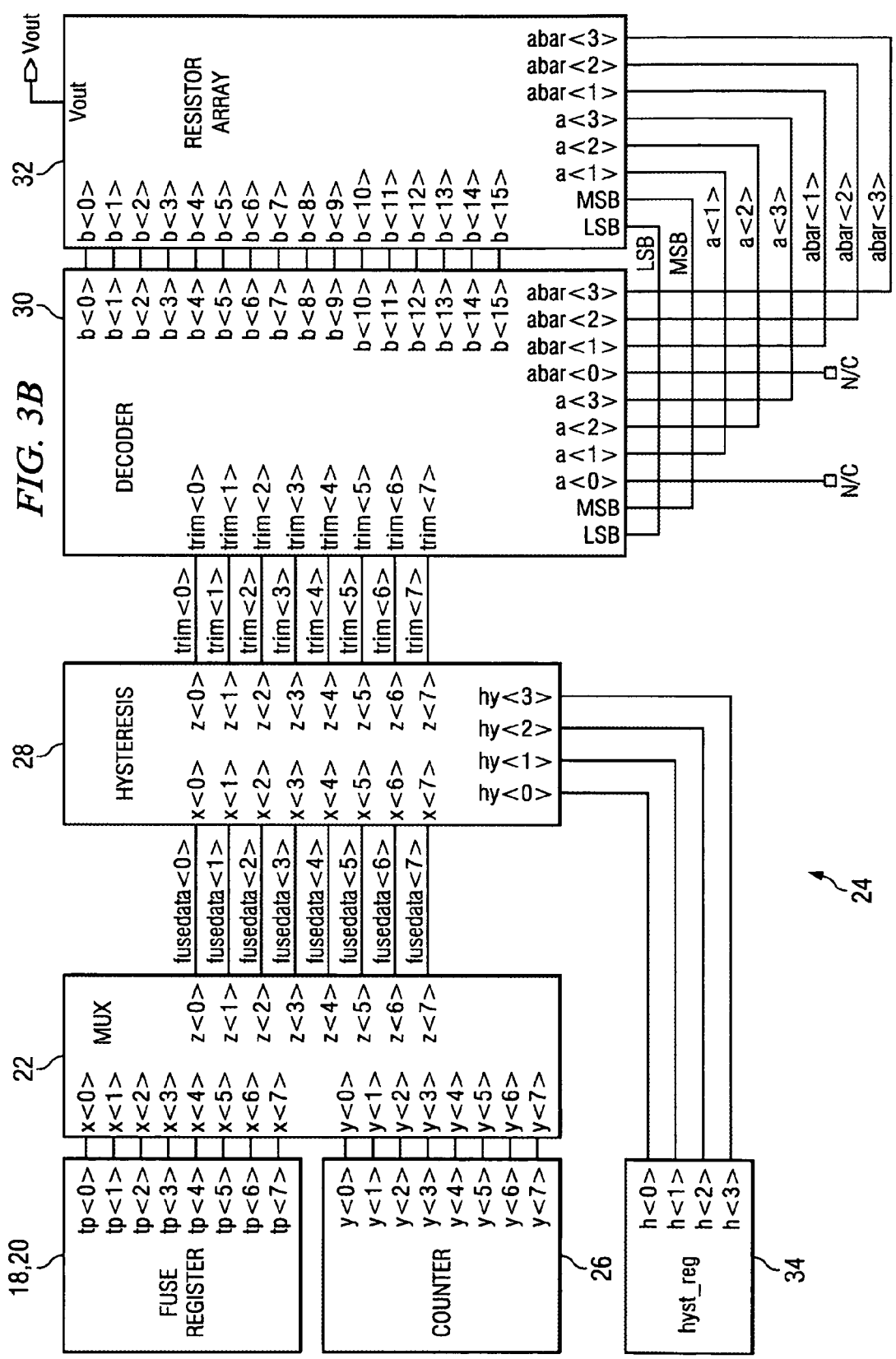
FIG. 3B shows a circuit diagram of a possible implementation of a digital-to-analog converter circuit for the temperature tampering detection circuit.

FIG. 3B shows a circuit diagram of a possible implementation of converter circuit 24. However, while FIG. 2 shows signal generator circuits 18 and 20, counter 26 and multiplexer circuit 22 as being separate components from converter circuit 24, the implementation of the converter circuit 24 shown in FIG. 3B combines all those circuits together. As shown in FIG. 3B, the outputs y<7:0> of the counter 26 and the outputs tp<7:0> of the signal generator circuits 18, 20 (provided by, for example, a fuse register or other programmable circuitry) are provided to the first and second inputs, x<7:0> and y<7:0>, respectively, of the multiplexer circuit 22. The output z<7:0> of the multiplexer circuit 22 is provided to a first input x<7:0> of a hysteresis circuit 28. The hysteresis circuit 28 further receives at a second input hy<3:0> a digital signal indicative of a hysteresis value to be applied by the hysteresis circuit 28 to the signals provided at the first input x<7:0>. The digital signal applied to the second input hy<3:0> is obtained from a signal generator 34 (provided by, for example, a fuse register or other programmable circuitry) comprising hysteresis signal h<3:0>. The output z<7:0> of hysteresis circuit 28 is provided to the input trim<7:0> of a decoder 30, which provides a decoded digital signal b<15:0> to the input b<15:0> of a resistor array 32. The decoder 30 further generates from the input trim<7:0> the decoded control outputs msb, lsb, a<3:0> and abar <3:0> which are applied to corresponding inputs of the resistor array 32. The resistor array 32 responds to signals msb, lsb, b<15:0>, a<3:0> and abar <3:0> to perform a digital-to-analog conversion to generate of the signal trim<7:0> representing a reference voltage vref (such as the counter 26 output or the vref1 and vref2 outputs from the circuit 18, 20) to an analog value and thus generate an analog signal vout (i.e., analog vref) corresponding to the digital input received thereby. This analog output signal vout is then applied to one input of the comparator 16 (see, FIG. 2).

Figure 3C:
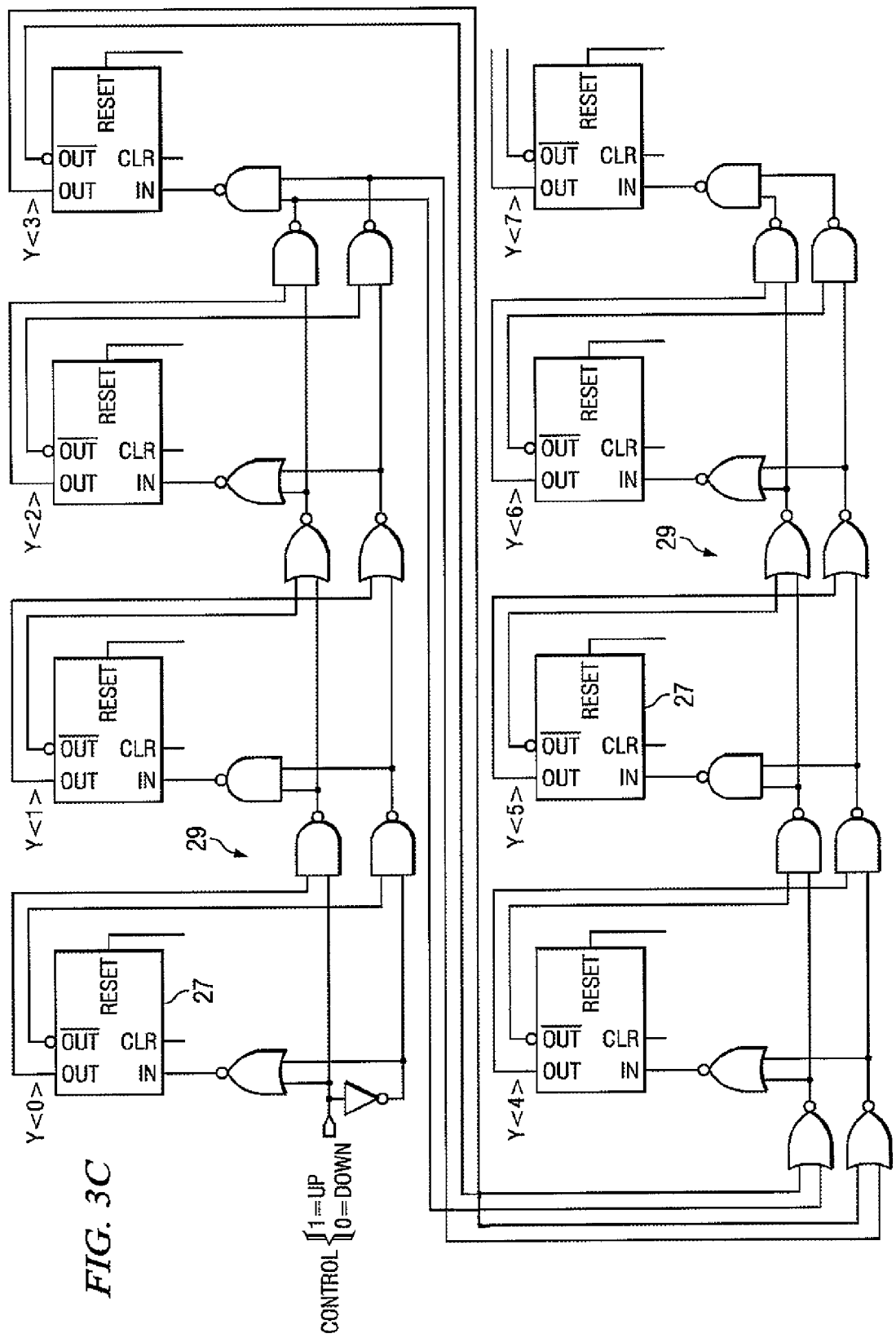
FIG. 3C shows a circuit diagram of a possible implementation of a counter for the temperature tampering detection circuit which is capable of incrementing and decrementing.

FIG. 3C shows a circuit diagram of a possible implementation of the counter 26. This counter 26 circuit is capable of both incrementing and decrementing, and thus can be used in test mode as described when incrementing to determine and set the digital values for the circuits 18, 20, and when decrementing for checking the hysteresis of the comparator 16. The counter 26 uses a plurality of logic gates (NANDs and NORs) along with 1 bit flip flops 27 or registers connected in a counter circuit configuration 29 for up- and down-counting with the count value output y<7:0> being taken at the output of each flip-flop 27. The input receives a control signal and the circuit counts up if the control signal is logic 1 and counts down if the control signal is logic 0.

Figures 1, 3D:
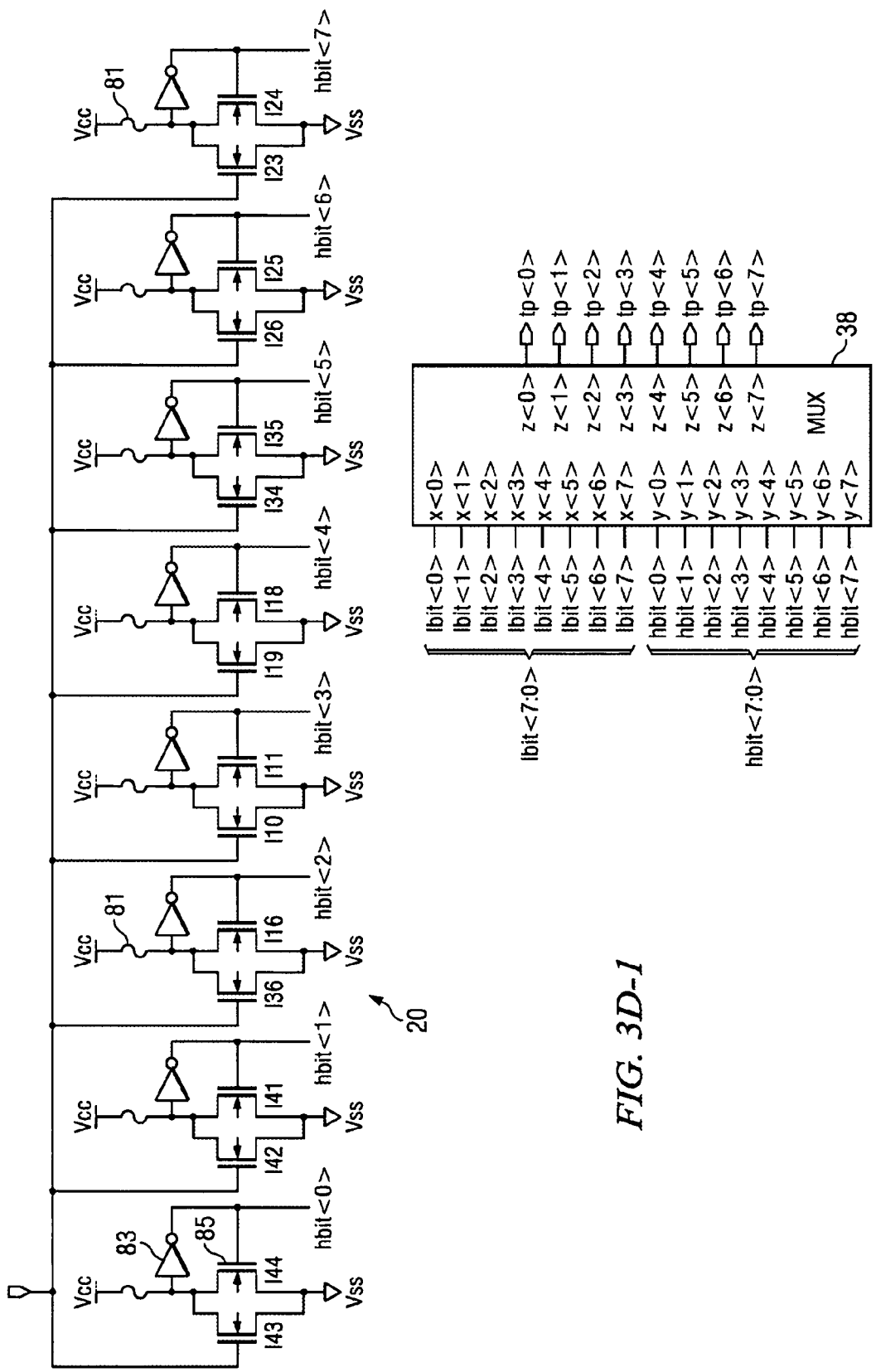
Figures 2, 3D:
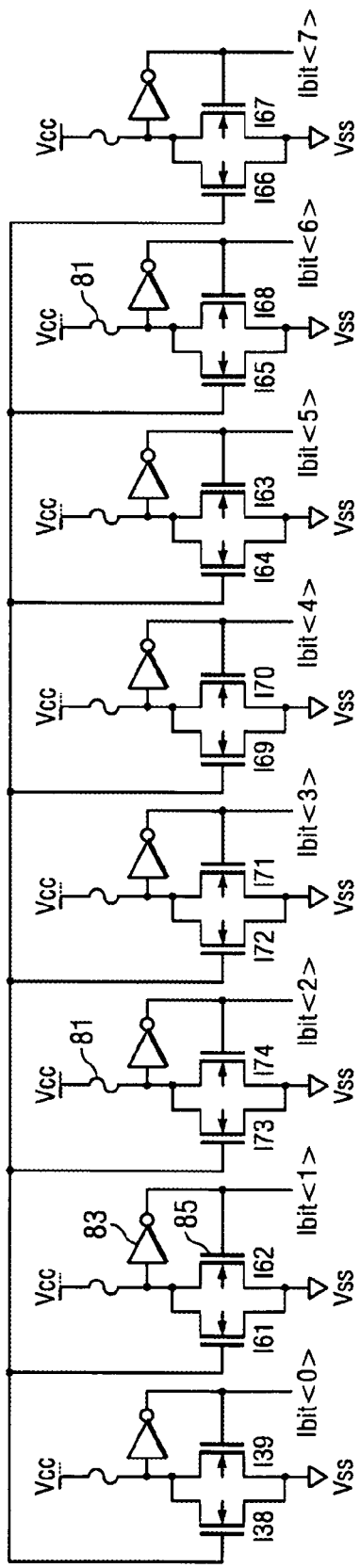

FIG. 3D1-2 shows a circuit diagram of a possible implementation of signal generator circuits 18 and 20, each of which may include a number of fuse elements 81 which together form a fuse register. At each fuse location, a combination of an inverter 83 and transistor 85 forms a latch which operates to latch the lbit/hbit value which is indicated by the state of the fuse 81. The output of each fuse register lbit<7:0>/hbit<7:0> is a multi-bit digital signal that is provided to a multiplexer 38 which makes a selection between lbit<7:0> and hbit<7:0> to generate the output tp<7:0> which is provided to multiplexer circuit 22. Multiplexer 38 is controlled in part by the output of comparator 12. In circuit 18, the fuse register generates outputs lbit<7:0> for application to inputs x<7:0> of the multiplexer 38. In circuit 20, the fuse register generates outputs hbit<7:0> for application to inputs y<7:0> of the multiplexer 38.

Figure 3E:
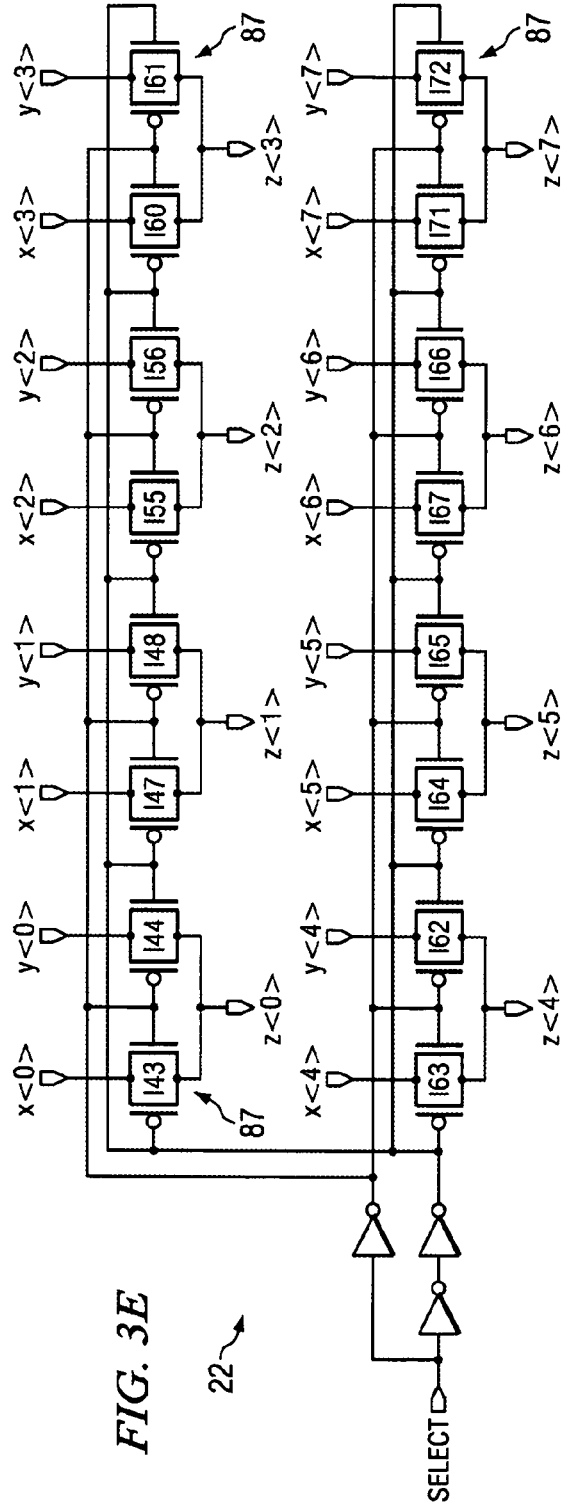
FIG. 3E shows a circuit diagram of a possible implementation of a multiplexer circuit for the temperature tampering detection circuit.

FIG. 3E shows a circuit diagram of a possible implementation of multiplexer circuit 22. Responsive to the select signal, the circuit of FIG. 3E chooses either input x<7:0> or input y<7:0> to be transferred to output z<7:0>. To accomplish this goal, the x<7:0> and y<7:0> inputs are applied to complementary parallel connected pass transistors 87 whose gates are driven by complementary SELECT signals. Depending on SELECT signal state, one complementary parallel connected pass transistor 87 in a pair is actuated to pass its input to the output z<7:0>. A similar circuit may be used for the multiplexer 38 of FIG. 3D.

Figure 3F:
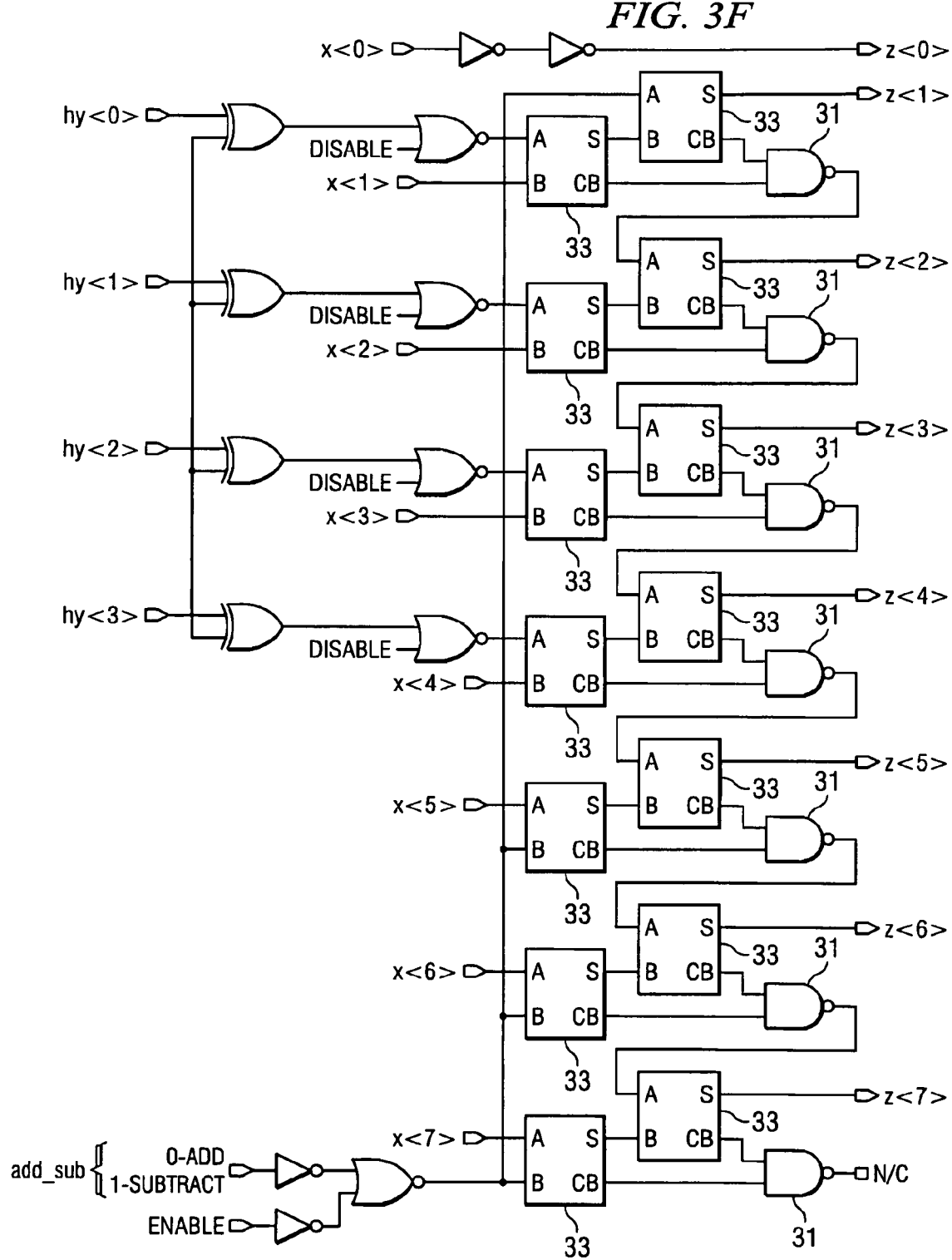
FIG. 3F shows a circuit diagram of a possible implementation of a hysteresis circuit for the temperature tampering detection circuit.

FIG. 3F shows a circuit diagram of a possible implementation of hysteresis circuit 28. The circuit receives signal x<7:0> and outputs signal y<7:0>. The circuit further receives a hysteresis offset value hy<3:0>. The hysteresis offset value hy<3:0> comprises hysteresis signal h<3:0> output from the hysteresis register 34 (see, FIG. 3B). Logic circuitry comprising a plurality of interconnected NAND gates 31 and half adder circuits 33 adds or subtracts the hysteresis offset value to the received signal x<7:0> to obtain the hysteresis adjusted output signal y<7:0>. A control signal add_sub controls operation of the logic circuitry to implement an add when the control signal is logic 0 and a subtract when the control signal is logic 1. It will be understood that the applied hysteresis could be zero in which case the hysteresis offset value hy<3:0> could be zero, or alternatively the hysteresis circuit 28 could be omitted from FIG. 3B completely by connecting the z<7:0> output of multiplexer 22 to the trin<7:0> input of decoder 30.

Figure 3G:
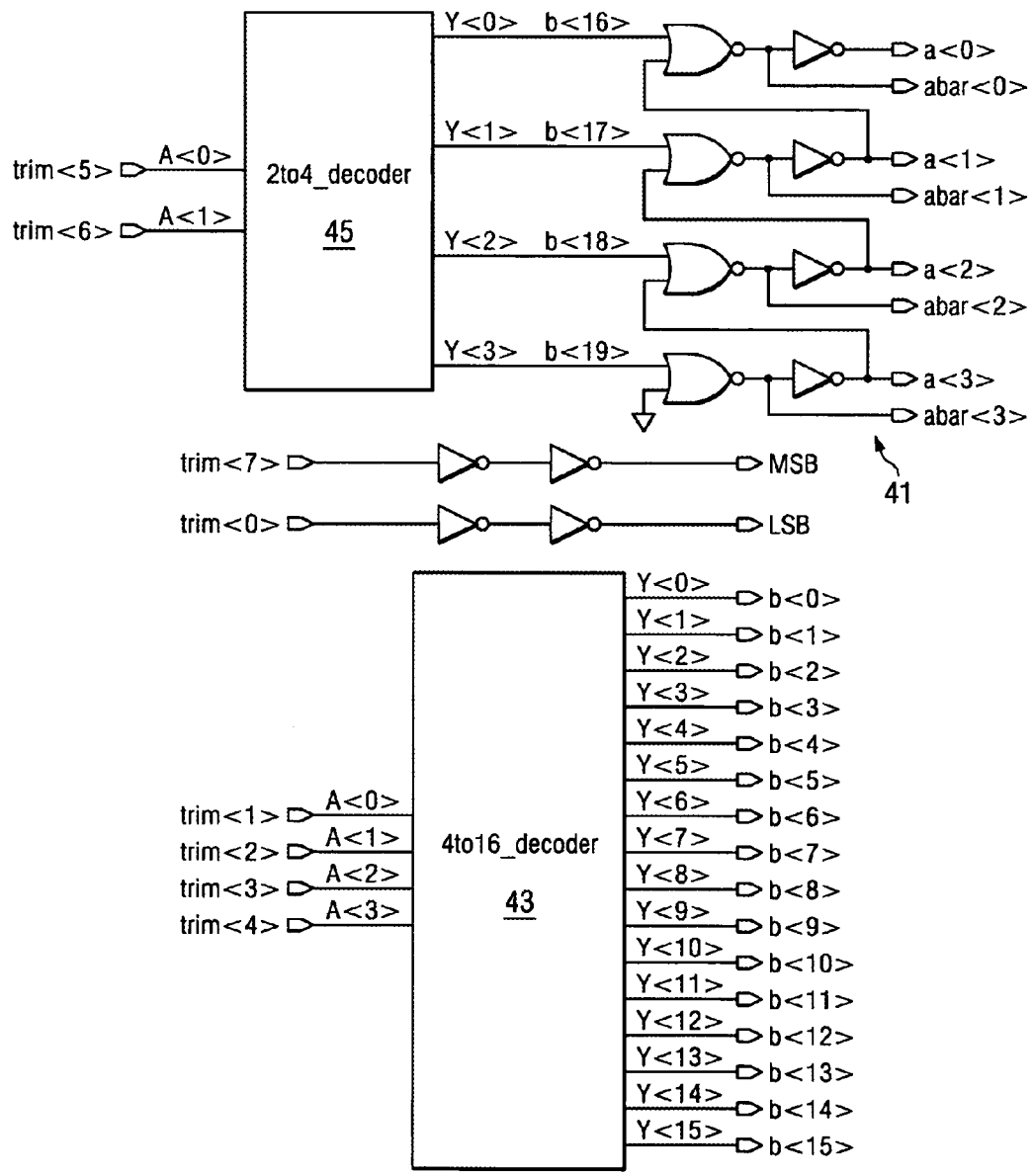
FIG. 3G shows a diagram for a possible implementation of a decoder circuit for the temperature tampering detection circuit.
Figure 3H:
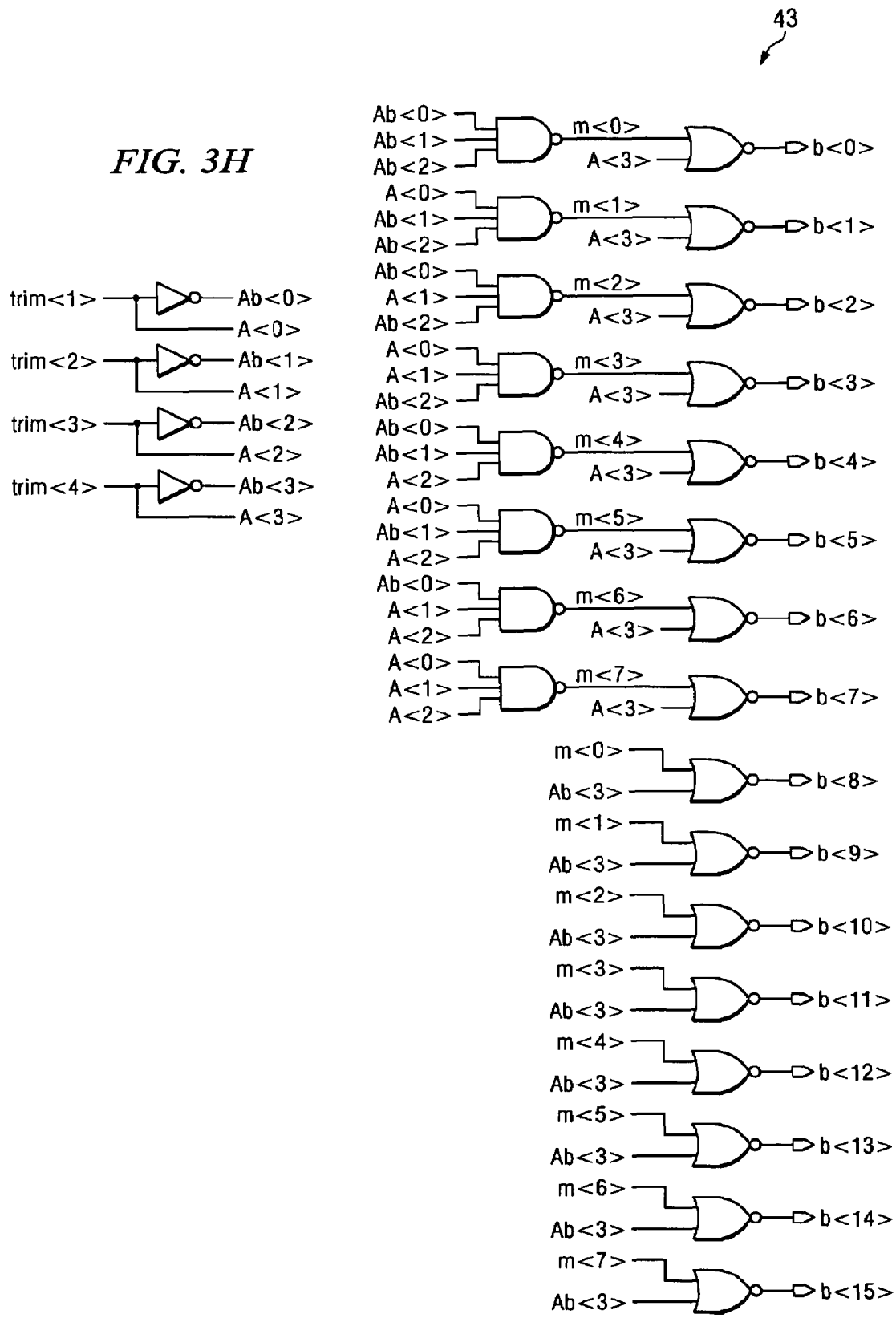
FIG. 3H shows a diagram for a possible implementation of a 4:16 decoder for the decoder circuit of FIG. 3G.
Figure 3I:
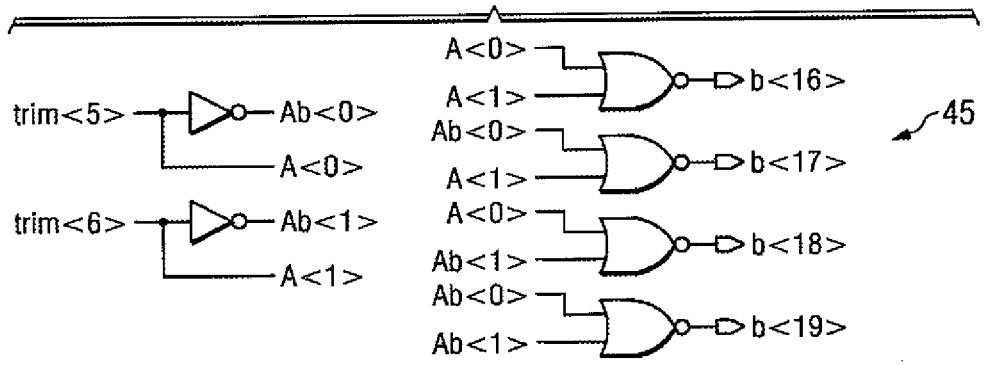
FIG. 3I shows a diagram for a possible implementation of a 2:4 decoder for the decoder circuit of FIG. 3G.

FIG. 3G shows a diagram for a possible implementation of decoder 30. The decoder includes a 4:16 decoder 43 (illustrated in the schematic of FIG. 3H) and a 2:4 decoder 45 (illustrated in the schematic of FIG. 3I). The 4:16 decoder 43 receives the signals trim<4:1> from the hysteresis circuit 28 and decodes those signals to generate the signals b<15:0> for application to the resistor array. The signals b<15:0> control, in a manner to be described, resistor pass gates for taps in the resistor array for purposes of analog voltage selection. The 2:4 decoder receives the signals trim<6:5> and decodes those signals to produce signals b<19:16> for application to a logic circuit 41 which then generates the complementary control signals a<3:0> and abar<3:0> which control, in a manner to be described, resistor pass gates for shunts in the resistor array 32 with respect to course tuning of the generated analog voltage. The signals trim<0> and trim<7> are not decoded, but rather are buffered by two inverters and passed on to provide most significant bit (msb) and least significant bit (lsb) information which controls, in a manner to be described, resistor pass gates for shunts in the resistor array 32 for purposes of finest trimming of the generated analog voltage.

FIG. 3J1-4 shows a circuit diagram for a possible implementation of the resistor array 32 for use in performing the digital-to-analog decoding. As described above, this part of converter circuit 24 may include a resistor string (including a set of series connected resistors 322 forming a voltage divider) with a number of pass gate transistors 335 which effectively serve as taps in the string for providing a selected voltage from the resistors 322 of the resistor string for connection to the output vout. The pass gate transistors 335 are controlled by the digital signal b<15:0> generated by the decoder 30 from signal generator circuits 18, 20 and counter 26 to make a tap selection in the voltage divider and thus select a divider voltage for output. It will be noted that an inverter array 325 converts signals b<15:0> to bbar<15:0>, and that both b<15:0> and bbar<15:0> are used to control the pass gates of transistors 335 for the resistors 322 in tapping the voltage divider of the resistor string. In order to provide a suitable number of tap points along the voltage divider of the resistor string to provide selectable voltages across the entire supply voltage range without using an equivalent number of resistors and pass gate transistors, resistor array 322 may include additional resistors 321 which are connected in series with the resistor string. Resistors 321 may be selectively shorted (shunted) by pass gate transistors controlled by signals a<3:0> and abar<3:0> output from the decoder 30 from signal generator circuits 18, 20 and counter 26. Resistors 321 and the corresponding shorting pass gate transistors provide coarse tuning by effectively voltage shifting (up and down) the voltages along resistors 322 in the resistor string (voltage divider) that are coupled to output vout. As a result, fewer resistors 322 and corresponding pass gate transistors 335 need to be utilized to achieve the desired number of voltage levels for connection to output vout. The circuit further includes resistors 323 which are also connected in series with the resistors 322 of the resistor string. Resistors 323 may be selectively shorted (shunted) by pass gate transistors controlled by signals msb and lsb output from the decoder 30 from signal generator circuits 18, 20 and counter 26. Resistors 323 and the corresponding pass gate transistors provide finest trim tuning by effectively voltage shifting (up or down) the voltages along resistors 322 in the resistor string that are coupled to output vout.

The resistor string (including resistors 321, 322 and 323) is connected between a first voltage reference (Vcc1) and second voltage reference (ground).

Figure 3L:
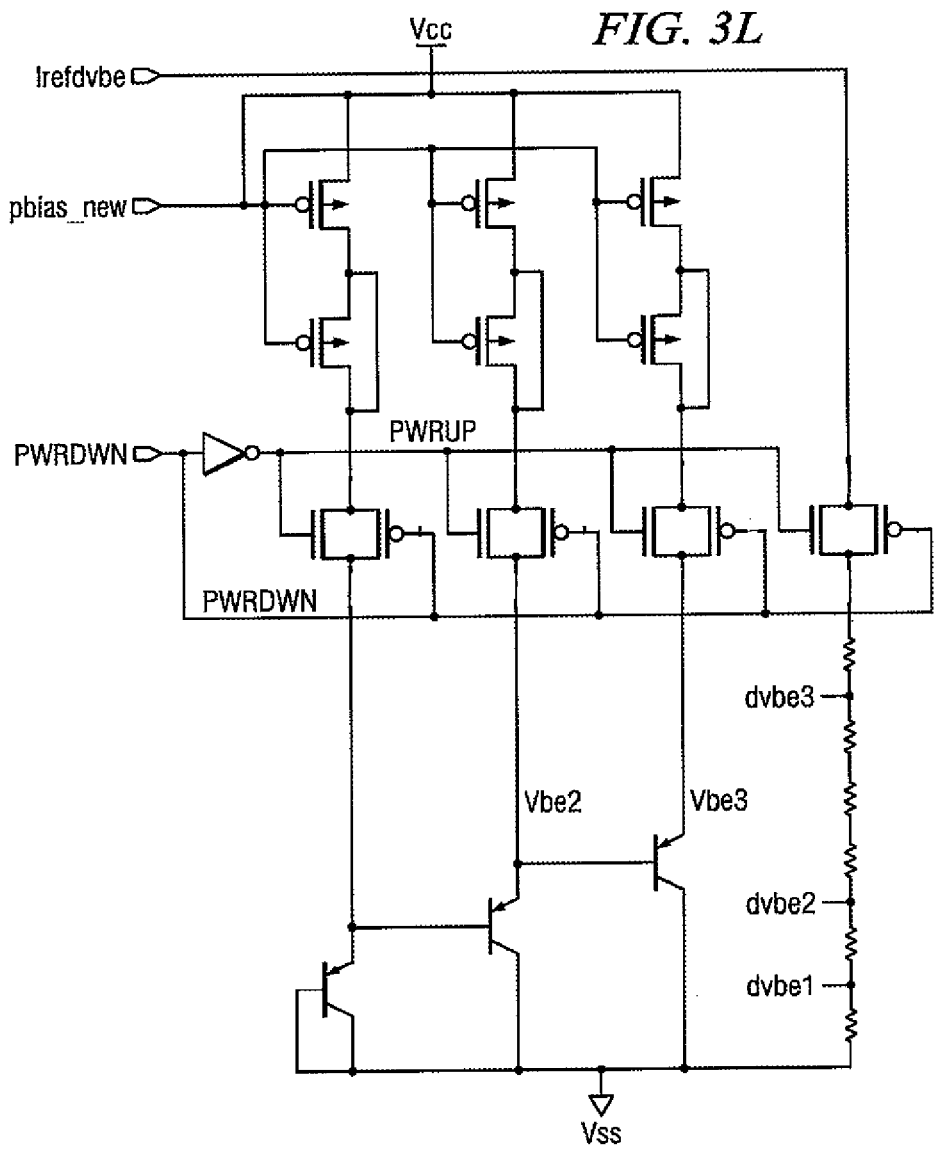
FIG. 3L shows a circuit diagram for a possible implementation of a signal generator circuit for the temperature tampering detection circuit.
Figures 1, 3J:
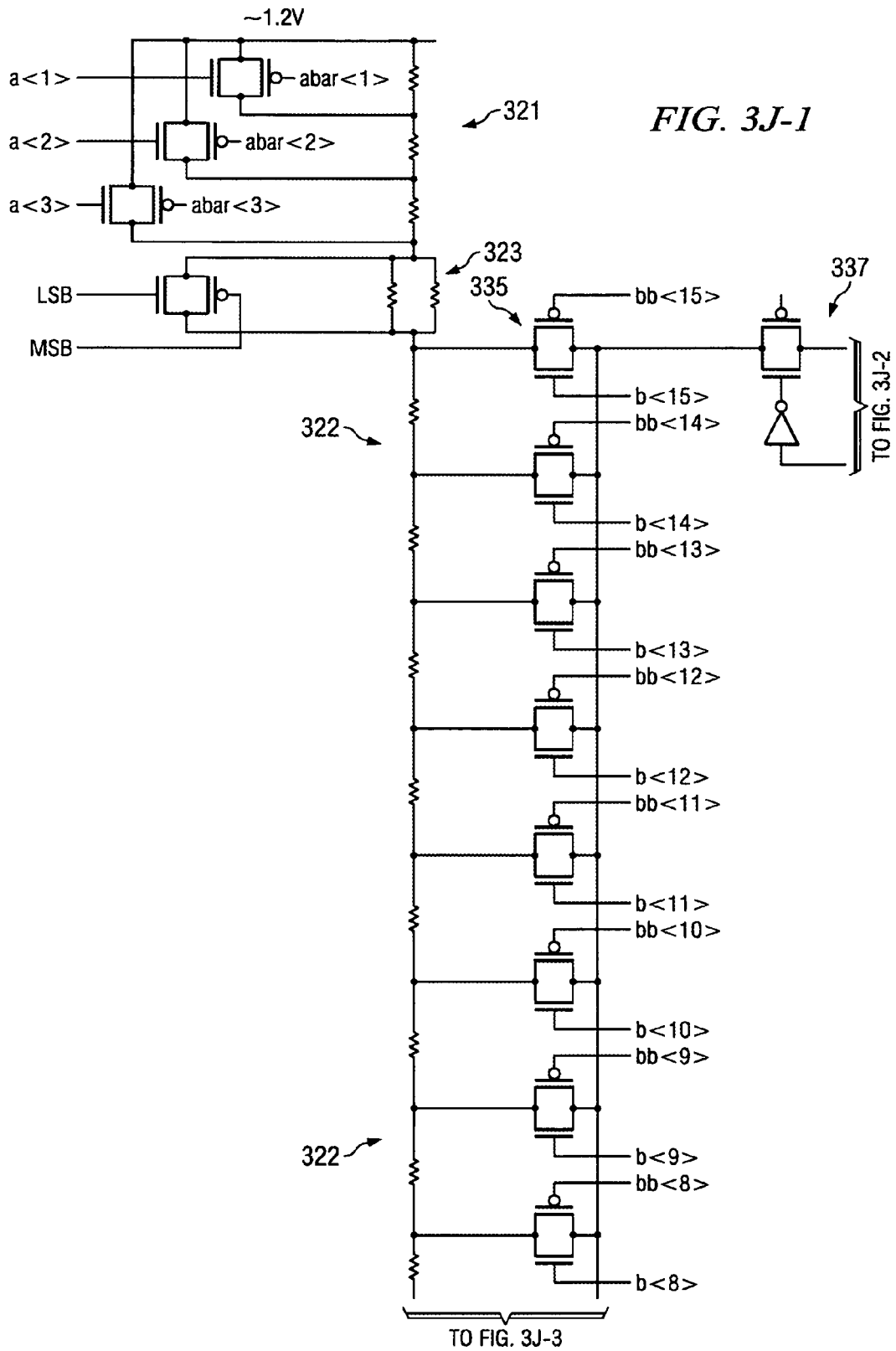
Figures 2, 3J:
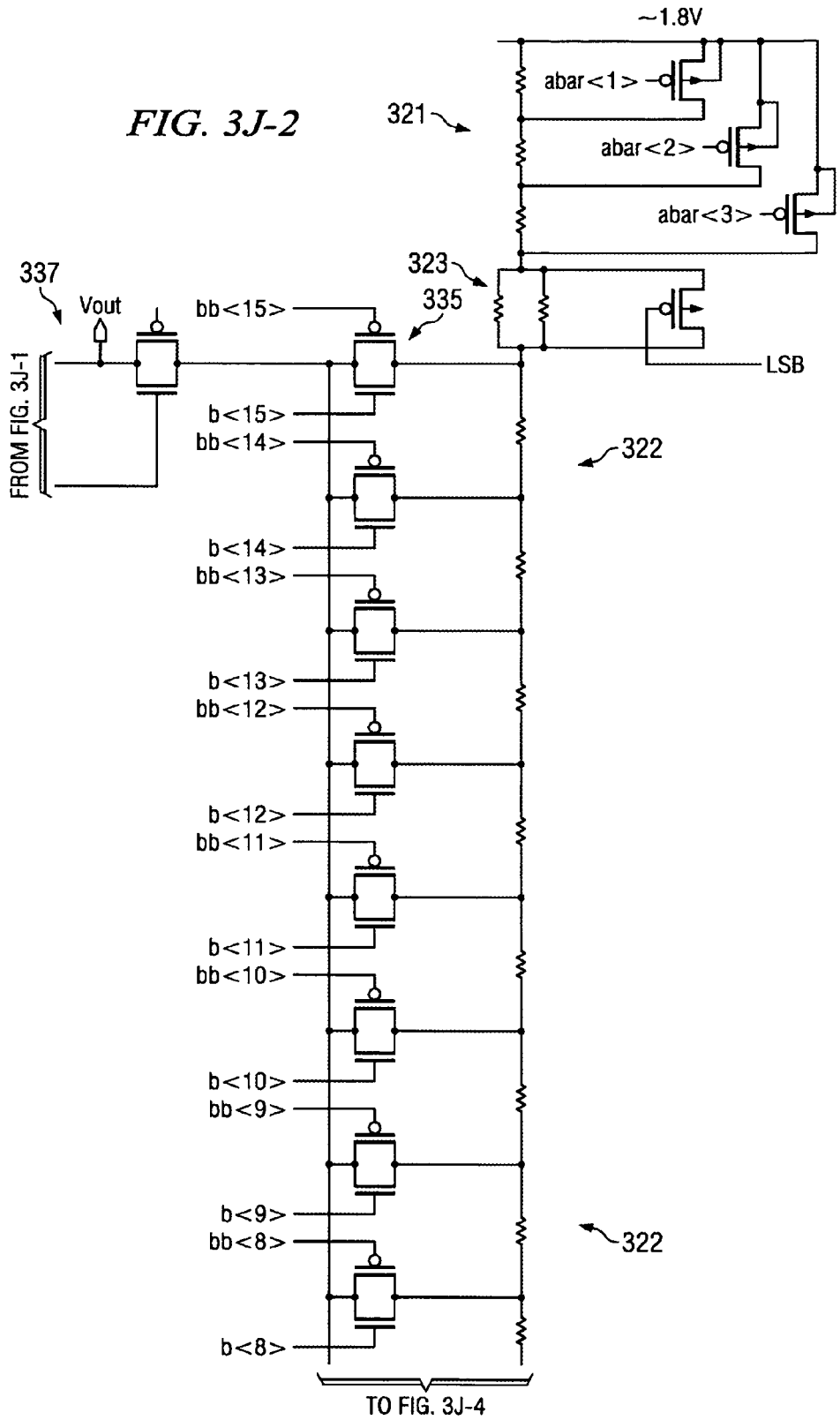
Figures 3, 3J:
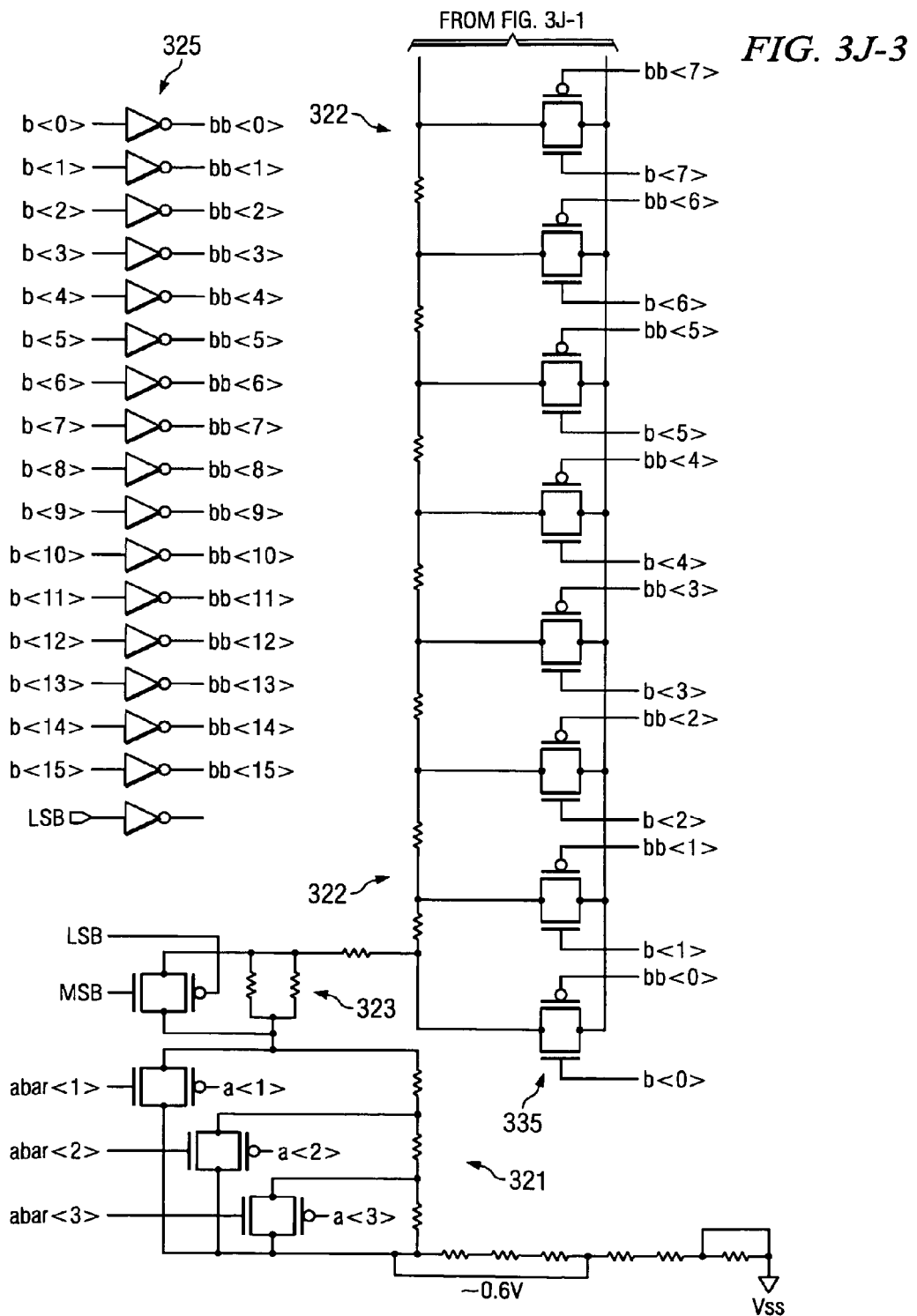
Figures 3, 3J, 4:
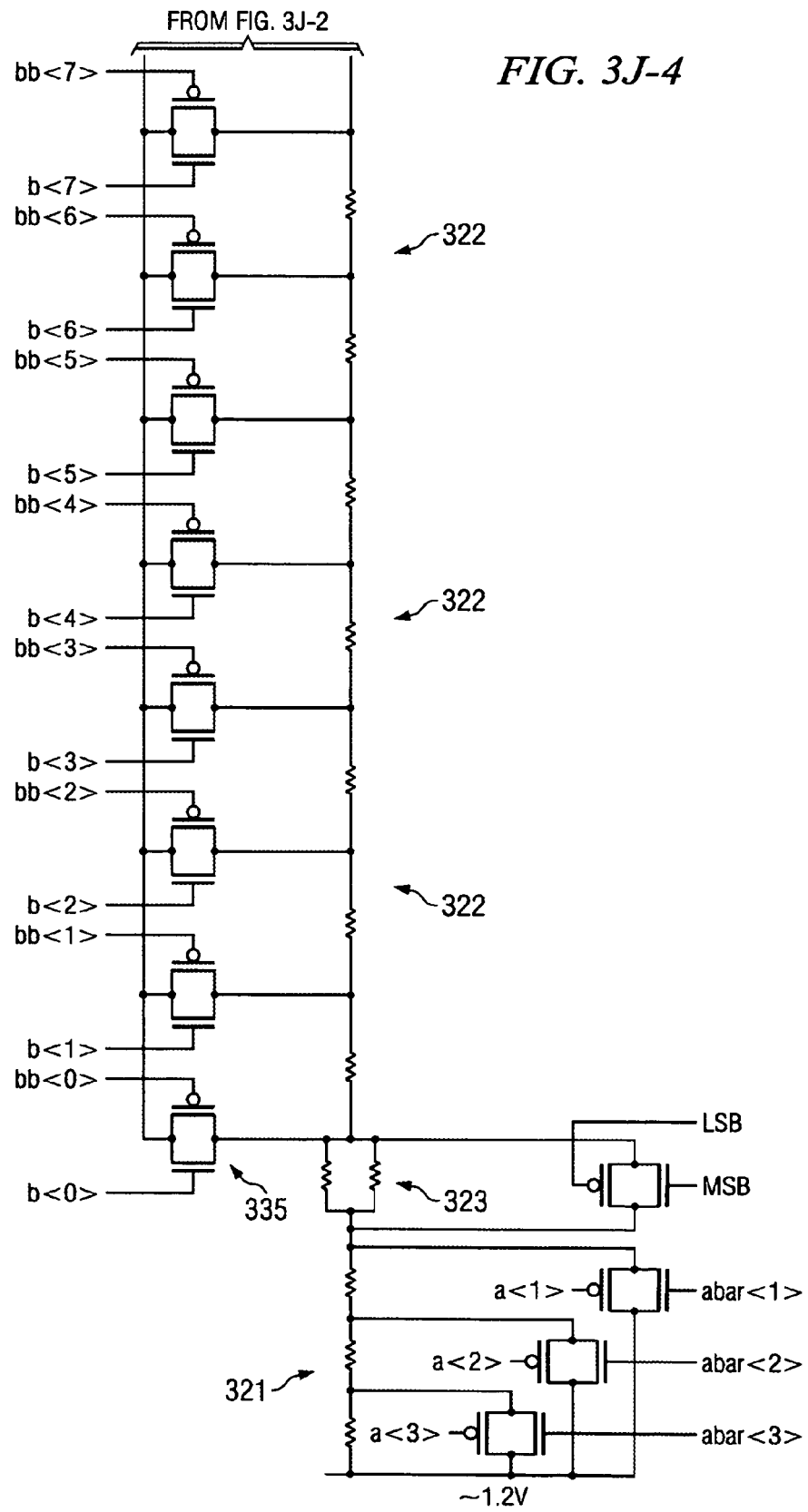

FIG. 3J further illustrates that the resistor array has been duplicated for two different voltage levels (approx 1.2v and approx 1.8v). Thus a second resistor string (including resistors 321, 322 and 323) is connected between a third voltage reference (Vcc2) and fourth voltage reference (ground). In this implementation, the first voltage reference may be 1.2v and the third voltage reference may be 1.8v. The second and fourth voltage references may be ground.

A selection circuit 337 operates responsive to control signals to choose between the 1.2v resistor string 322 and the 1.8v resistor string 322 for connection to vout.

Figure 3K:
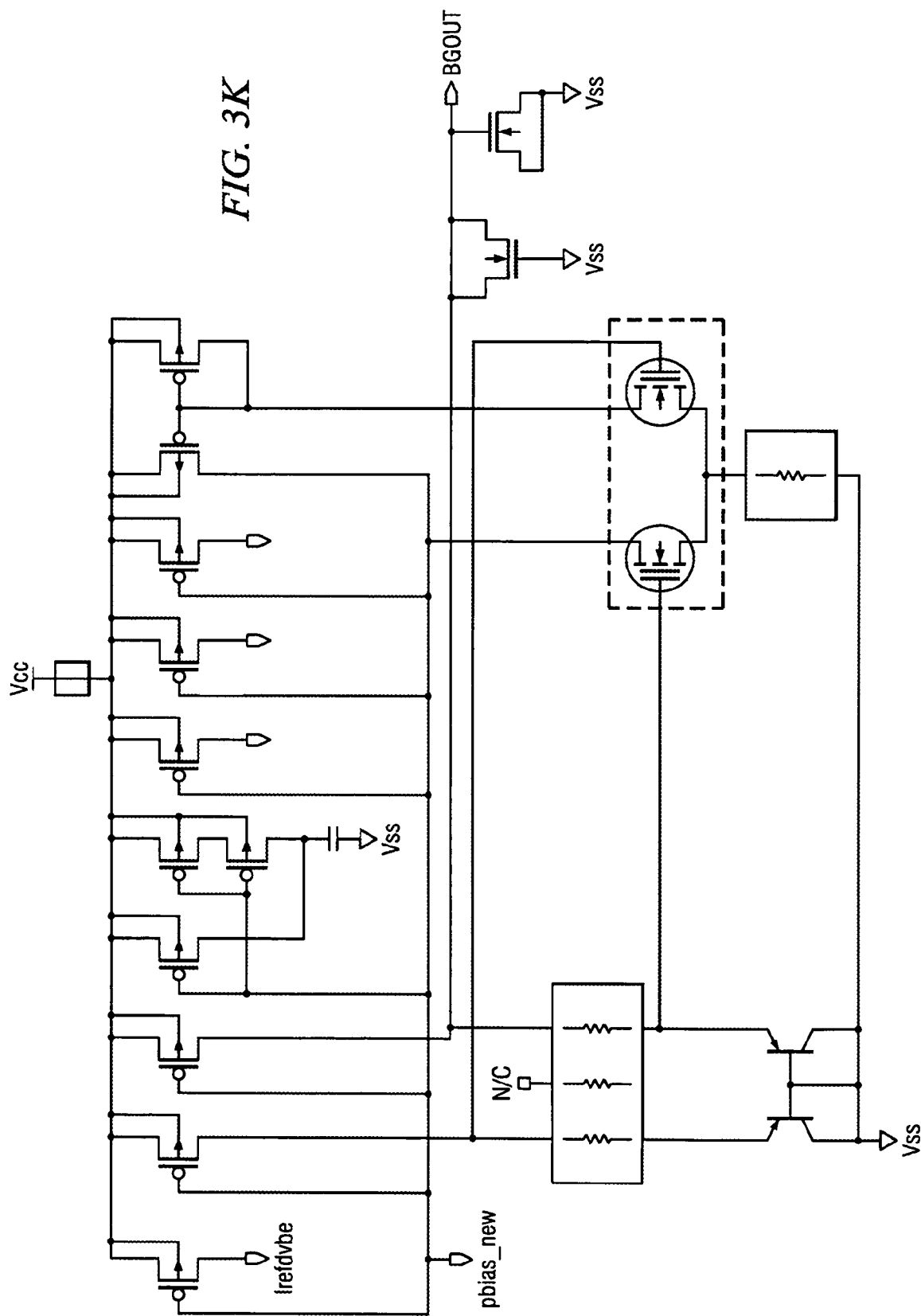
FIG. 3K shows a circuit diagram for a possible implementation of a bandgap voltage generator for the temperature tampering detection circuit.

FIG. 3K shows a circuit diagram for a possible implementation of a bandgap voltage generator. This circuit generates a reference current irefdvbe, a bias signal pbias_new and a bandgap output bgout. The circuit of FIG. 3K may further include a startup circuit in a manner known to those skilled in the art.

FIG. 3L shows a circuit diagram for a possible implementation of a signal generator circuit which includes one or more bipolar transistors possessing base-emitter junctions useful for measuring and monitoring Vbe and delta Vbe. The signal generator circuit receives the bandgap reference current Irefdvbe and bias signal pbias_new and operates to generate signals delta Vbe and Vbe. This circuit generates a 3 Vbe signal and dVbe signal. Three PNP transistor are stacked to form a 3 Vbe signal which has temperature coefficient of about −6 mv/c. Each PNP transistor is biased by pmos current source transistors with gate signal pbias_new. The DVBE3 signal is generated by feeding a PTAT (Proportional To Absolute Temperature, "Irefdvbe") current into a resistor. The resulting DVBE3 voltage is thus also PTAT. The DVBE3 Temperature coefficient is about +6 mv/c. A PWRDWN signal is used to power down this circuit, by disconnecting the current source transistors. When PWRDWN goes HIGH, the transmission gate is shut off and disconnect the biasing current. It will be noted that Irefdvbe is generated in the bandgap (see, FIG. 3K), wherein a voltage across a resistor is developed which is the difference of two VBE voltages based on different current densities. The current density can be based on different sized emitters and different values of currents going through each bipolar transistor.

Thus, Vbe is measured by passing a current through the bipolar transistor. A voltage divider circuit includes a tap from which delta Vbe may be obtained. Output signals vbe2 and dvbe2 in FIG. 3L are input to comparator 12 in FIGS. 2 and 3A as the signals vbe and delta vbe, respectively. The output signals vbe3 and dvbe3 in FIG. 3L are indirectly coupled to comparator 16 of FIG. 2.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A digital-to-analog converter, comprising:
an input adapted to receive a digital signal;
an output adapted to provide an analog signal corresponding to the digital signal;
a first resistor string comprising a first set of series connected resistors and a second set of series connected resistors, wherein the first and second sets are series connected together;
a first plurality of taps taken from the resistors in the first set of series connected resistors;
a first circuit adapted to select one of the first plurality of taps based on the received digital signal for connection to the output;
a first plurality of selectively actuated shunts around the resistors in the second set of series connected resistors; and
a second circuit adapted to select one or more of the first plurality of shunts based on the digital signal to effectuate a shift in voltage range for the analog signal at the output.

2. The converter of claim 1 wherein the first resistor string is connected between a first voltage node and a second voltage node and the second set of series connected resistors are series connected between the first set of series connected resistors and one of the first and second voltage nodes.

3. The converter of claim 1 wherein the first resistor string is connected between a first voltage node and a second voltage node and the second set of series connected resistors comprising first and second subsets of series connected resistors, a first subset of series connected resistors being series connected between the first set of series connected resistors and the first voltage node, and a second subset of series connected resistors being series connected between the first set of series connected resistors and the second voltage node.

4. The converter of claim 3 wherein the second circuit is adapted to select one or more of the first plurality of shunts associated with the first subset of series connected resistors, based on the digital signal, to effectuate an upward shift in voltage range for the analog signal at the output.

5. The converter of claim 3 wherein the second circuit is adapted to select one or more of the first plurality of shunts associated with the second subset of series connected resistors, based on the digital signal, to effectuate a downward shift in voltage range for the analog signal at the output.

6. The converter of claim 1, further comprising:
a second resistor string comprising a third set of series connected resistors and a fourth set of series connected resistors, wherein the third and fourth sets are series connected together;

a second plurality of taps taken from the resistors in the third set of series connected resistors;

a third circuit adapted to select one of the second plurality of taps based on the received digital signal for connection to the output;

a second plurality of selectively actuated shunts around the resistors in the fourth set of series connected resistors; and a fourth circuit adapted to select one or more of the second plurality of shunts based on the digital signal to effectuate a shift in voltage range for the analog signal at the output.

7. The converter of claim 6 further comprising a selection circuit adapted to select between first circuit selected connection of the first plurality of taps to the output and third circuit selected connection of the second plurality of taps to the output.

8. The converter of claim 6:
wherein the first resistor string is connected between a first voltage node and a second voltage node and the second set of series connected resistors are series connected between the first set of series connected resistors and one of the first and second voltage nodes; and
wherein the second resistor string is connected between a third voltage node and fourth voltage node and the fourth set of series connected resistors are series connected between the second set of series connected resistors and one of the third and fourth voltage nodes.

9. The converter of claim 6:
wherein the first resistor string is connected between a first voltage node and a second voltage node;
wherein the second resistor string is connected between a third voltage node and fourth voltage node;
wherein the second set of series connected resistors comprises first and second subsets of series connected resistors, a first subset of series connected resistors being series connected between the first set of series connected resistors and the first voltage node, and a second subset of series connected resistors being series connected between the first set of series connected resistors and the second voltage node; and
wherein the fourth set of series connected resistors comprises first and second subsets of series connected resistors, a first subset of series connected resistors being series connected between the third set of series connected resistors and the third voltage node, and a second subset of series connected resistors being series connected between the third set of series connected resistors and the fourth voltage node.

10. A digital-to-analog converter, comprising:
a string of series connected resistors which are divided into a first string portion connected in series with a second string portion at a first node, wherein the first string portion includes a first plurality of series connected resistors and the second string portion includes a first plurality of series connected resistors;
a first set of circuits, responsive to a digital input signal and coupled to the first node and connection nodes in the second string portion, adapted to selectively choose one node from the first node and connection nodes for connection to output an analog output signal; and
a second set of circuits, responsive to the digital input signal and coupled to the first node and connection nodes the first string portion, adapted to selectively shunt across resistors in the first string portion to shift a voltage range in which the output analog output signal lies.

11. The converter of claim 10 wherein the divided string of series connected resistors further includes a third string portion connected in series with the second string portion at a second node, wherein the third string portion includes a third plurality of series connected resistors, and further including:
a third set of circuits, responsive to the digital input signal and coupled to the second node and connection nodes the third string portion, adapted to selectively shunt across resistors in the third string portion to shift the voltage range in which the output analog output signal lies.

12. A digital-to-analog converter, comprising:
a first string of series connected resistors connected between a first and a second power supply nodes;
a second string of series connected resistors connected between a third and a fourth power supply nodes;
a first set of circuits, responsive to a digital input signal and coupled to connection nodes in the first string of series connected resistors, adapted to selectively choose one node from the connection nodes for connection to a first intermediate analog voltage node;
a second set of circuits, responsive to the digital input signal and coupled to connection nodes in the second string of series connected resistors, adapted to selectively choose one node from the connection nodes for connection to a second intermediate analog voltage node; and
a circuit adapted to selectively connect one of the first and second intermediate analog voltage nodes to output an analog output signal corresponding to the digital input signal, wherein the circuit that is adapted to selectively connect is responsive to a control signal indicative which one of the first and second strings of series connected resistors is to be used in generating the analog output signal.

13. The converter of claim 12 further including, for each of the first and second strings of series connected resistors, a voltage level shifting circuit coupled to a portion of the string and adapted to operate responsive to the digital input signal to selectively shunt across one or more of the resistors included in the portion to shift a voltage range in which the analog output signal lies.

14. A method, comprising:
dividing a string of series connected resistors into a first string portion connected in series with a second string portion at a first node, wherein the first string portion includes a first plurality of series connected resistors and the second string portion includes a first plurality of series connected resistors;
selectively tapping from the second string portion in response to a digital input signal to generate an analog output signal; and
selectively shunting across resistors in the first string portion to shift a voltage range in which the output analog output signal lies.

15. The method of claim 14 wherein dividing further comprises dividing the string of series connected resistors to further include a third string portion connected in series with the second string portion, wherein the third string portion includes a third plurality of series connected resistors, and further including:
selectively shunting across resistors in the third string portion to shift the voltage range in which the output analog output signal lies.

* * * * *